United States Patent
Runonen

(10) Patent No.: US 6,557,692 B2
(45) Date of Patent: May 6, 2003

(54) BOARD TURNER APPARATUS

(75) Inventor: Veli Pekka Runonen, Vantaa (FI)

(73) Assignee: Raute OYJ, Nastola (FI)

( * ) Notice: Subject to any disclaimer, the term of this patent is extended or adjusted under 35 U.S.C. 154(b) by 62 days.

(21) Appl. No.: 09/832,907

(22) Filed: Apr. 12, 2001

(65) Prior Publication Data

US 2001/0030103 A1 Oct. 18, 2001

(30) Foreign Application Priority Data

Apr. 12, 2000 (FI) .............................. 20000872

(51) Int. Cl.$^7$ .............................................. B65G 47/54
(52) U.S. Cl. ...................... 198/403; 414/760; 414/773
(58) Field of Search ........................... 198/403; 414/750, 414/760, 761, 773, 790

(56) References Cited

U.S. PATENT DOCUMENTS

| | | | | |
|---|---|---|---|---|
| 2,527,024 A | * | 10/1950 | Mitchell | 198/403 |
| 2,909,876 A | * | 10/1959 | McGihon | 198/403 |
| 3,536,206 A | * | 10/1970 | Ruddick | 198/403 |
| 3,887,066 A | * | 6/1975 | Houtsager | 198/403 |
| 4,050,574 A | * | 9/1977 | Chenevard | 198/404 |
| 4,220,239 A | * | 9/1980 | Prichard, Jr. | 198/403 |
| 5,006,037 A | * | 4/1991 | Bluemle | 414/771 |
| 5,665,197 A | | 9/1997 | Fujii et al. | 156/558 |

FOREIGN PATENT DOCUMENTS

| | | | | |
|---|---|---|---|---|
| SU | | 459392 | 3/1975 | |
| SU | | 861066 | 9/1981 | |
| SU | | 1219-490 A | * 3/1986 | 198/403 |

* cited by examiner

Primary Examiner—Douglas Hess
(74) Attorney, Agent, or Firm—Connolly Bove Lodge & Hutz LLP

(57) ABSTRACT

The present invention relates to an apparatus for turning the top side of planar objects (1, 2) such as plywood or particle boards into the underside, the apparatus comprising an importing conveyor and an exporting conveyor, and a board turner assembly mounted between the conveyors. The board turner is formed by at least two sets of turning fingers (5, 6), each one of the sets having its fingers aligned in the same plane and being adapted to rotate about a common axis parallel with said plane. The construction of the conveyors is such that it permits the fingers (5, 6) during their rotary motion to pass through gaps of the conveyors. Each one of said sets of turning fingers (5, respectively 6) are arranged to be turned independently from each other.

9 Claims, 2 Drawing Sheets

BOARD TURNER APPARATUS

Figure 1:
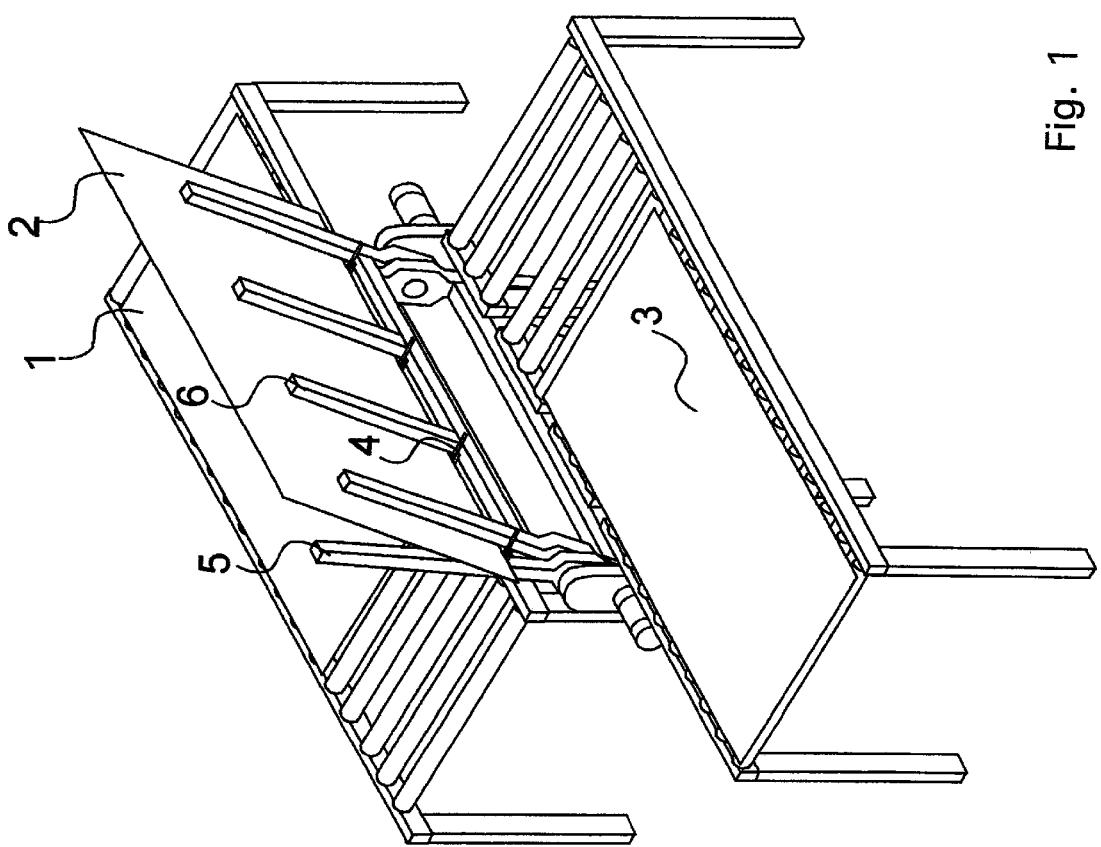

The present invention relates to an apparatus called a board turner, typically used in the manufacture of different composite boards such as plywood or particle boards. These manufacturing processes give rise to a need for turning a board around so that the upper side becomes the lower side of the board. This requirement appears, e.g., in the grading inspection of the boards.

To this end, there is used an apparatus comprising two conveyors and a board turner placed therebetween. One of the conveyors acts as an importing conveyor, i.e. infeed conveyor of the board to be turned, while the other conveyor performs as an exporting conveyor, i.e. outfeed conveyor of the turned board. The board turner is comprised of turning arms or fingers that are mounted on a common rotary shaft into lined groups forming an assembly later called a finger turnstile. The fingers of each lined group in the finger turnstile are mounted in the same plane passing through the center of rotary shaft of the finger turnstile. A conventional construction of the finger turnstile is provided with four sets of fingers in a 90° angular disposition in respect to each other about the shaft. The finger turnstile is configured into an integrated assembly that can be rotated about its center axis by means of an electric or hydraulic motor.

A drawback of this construction is that its degree of freedom in regard to its rotation is extremely constrained at the instant a board is being transferred into a slot of the finger turnstile and, respectively, at the instant of board removal from a slot of the finger turnstile onto the outfeed conveyor. In practice, the finger turnstile must be kept stopped during either of these operations. A solution to this problem has been sought from synchronized operation of the board feed/removal motions with the rotational motion of the finger turnstile by means of different speed control arrangements. However, such systems have become complicated and, hence, the operating speed of the system has remained slow in spite of these efforts.

Now, a substantial improvement to the operating speed of a board turner apparatus system has been achieved by way of altering the basic construction of one fundamental member of the system, namely, the finger turnstile.

The present construction makes it possible to achieve an operating sequence, wherein the board to be turned around is delivered from the rising portion of the turning motion by means of one finger set to another finger set that is waiting on the descending portion of the turning motion, by means of a short angular movement passing through the vertical top-dead position. This kind of motion can be accomplished by way of adapting the receipt of a board falling onto the descending side of the finger turnstile to take place by means of a finger set that has been driven into a position slightly past the vertical top-dead position so as to be therein ready for the receipt of the board or, alternatively, is at least in a motion toward this position. The angular movement required from the finger set to pass over the vertical top-dead position is small and, while the finger sets are still in this position, the conveyors of the system may operate without any wait states so as to keep on importing a new board to the fetch area of the board turner and, respectively, exporting a previously turned and lowered board off from the outfeed area of the turner.

Figure 2:
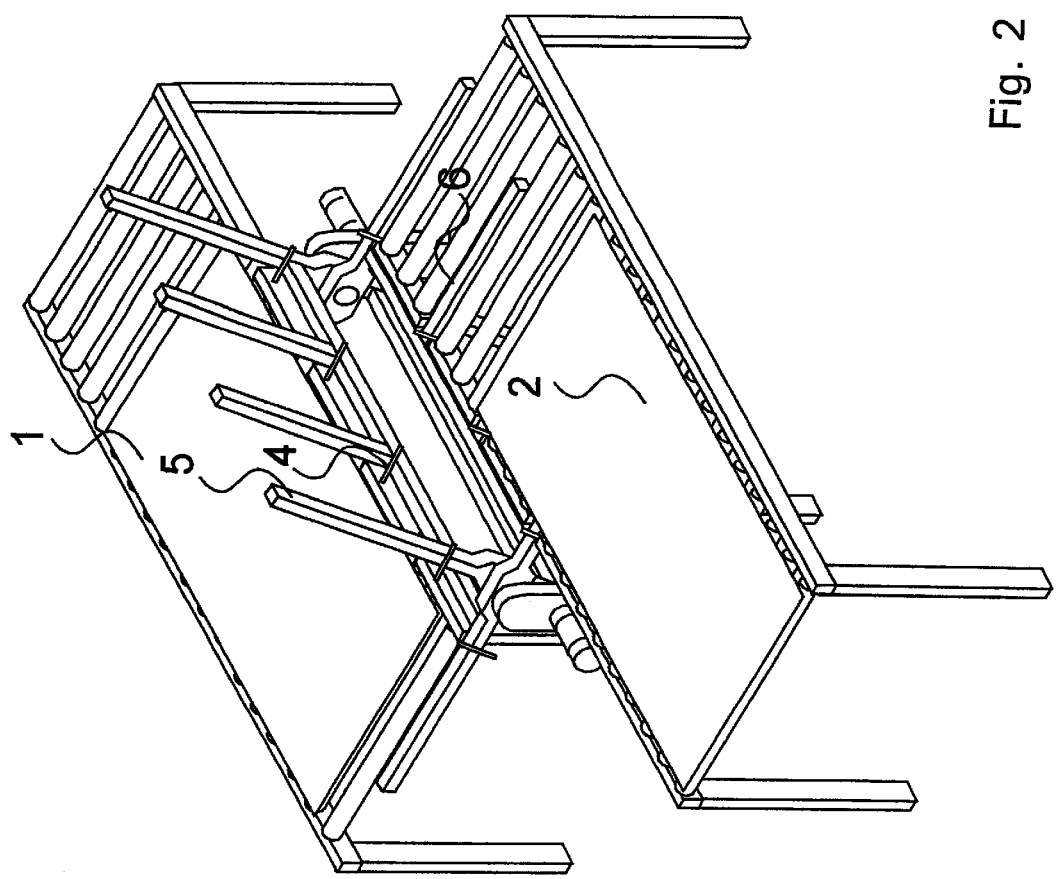

Next, the invention will be depicted in greater detail with the help of the attached drawings, wherein FIG. 1 shows an embodiment of an apparatus according to the invention in its operating step where the board to be turned is delivered from one finger set to another; and FIG. 2 shows the same apparatus in its operating state wherein the boards are transferred by means of conveyors within the fetch and outfeed areas.

In FIG. 1 is schematically shown an apparatus with two conveyors, one of which serves to bring a board 1 to be turned to the finger turnstile while the other conveyor respectively serves for transferring to subsequent processing a board 3 that has been turned during the preceding operating step. In the illustrated embodiment, the conveyors are adapted to operate in parallel along the axial direction of the finger turnstile. The finger turnstile is located between the conveyors so that its rotary axis is parallel to the operating direction of the conveyors. Obviously, the construction of the conveyors over their length mating with the finger turnstile must be such that permits free rotation of the fingers 5 and 6 in a meshing manner through gaps provided in the conveyor structure. In the diagram, the board 2 being turned is shown transferred from the fetching finger set 5 to the delivering finger set 6.

The two finger sets 5 and 6 are both comprised of a plurality of fingers displaced at a distance from each other in the direction of the rotary axis, each set in its own plane incorporating the rotary axis of the respective finger set. The set formed by fingers 5 is equipped with one independently controlled turning actuator and, respectively, the set formed by fingers 6 is connected to another independently controlled turning actuator. This kind of arrangement permits the rotary motion of either finger set to take place independently from the other set. While the apparatus may be constructed in its basic form using only two sets of fingers in the manner described above, a more advantageous function of the system can be attained by combining both of the finger sets 5 and 6 with a complementary finger set which projects in the opposite direction from the rotating axis, and is respectively driven by the same actuator. According to a special feature of the invention, a set and its complementary set can be slightly deviated from the mutual planar position.

In the operating step shown in FIG. 1, the fetching finger set 5 has elevated a board 2 away from the infeed conveyor that already is importing the next board to the turner. Prior to the elevation of board 2 from the infeed conveyor, finger set 5 has lowered a board 3 onto the outfeed conveyor and has flipped its fingers from under the conveyor to under the board 2 resting on the infeed conveyor. In an alternative embodiment having each one of the fingers sets cooperating with a complementary finger set, the complementary finger set of finger set 5 has lowered board 3 onto the outfeed conveyor substantially simultaneously with the instant at which finger set 5 has elevated board 2 off from the infeed conveyor. Meanwhile, finger set 6 has remained halted into a waiting position that is slightly past the top-dead vertical point, thus therein being ready to receive board 2 being fetched by finger set 5. After receiving board 2, finger set 6 begins its rotary motion and lowers board 2 onto the outfeed conveyor as shown in FIG. 2. Respectively, finger set 5 rotates into a waiting position that is slightly past the top-dead vertical point, thus therein being ready to receive board 1 being fetched and elevated into the delivery position by finger set 6. It is also possible to halt the finger set waiting for the delivery of a board in a position which is slightly in advance to the top-dead vertical point, whereby both finger sets co-rotate over a narrow angular sector past the top-dead vertical point thus clamping therebetween the board being turned. Subsequently, the fetching/delivering finger set can perform a small reverse motion into the position which is slightly in advance to the top-dead vertical point in order to wait therein the next board to be turned.

The function of the apparatus allows continuous operation of the conveyors during the steps of importing a new board to the turner and, respectively, of exporting a turned board meanwhile the finger sets are performing a rotary motion to turn a board, whereby a substantial improvement in the operating speed of the apparatus can be attained.

To the function of the finger turnstile, it is advantageous to have the fingers 5 and 6 equipped with brackets 4 projecting outward from the fingers tangentially with respect to the rotary motion. These brackets are located at the proximal end area of the fingers, and their function is to keep the board being turned at a proper offset distance from the rotation axis so that the boards will be lowered correctly aligned onto the conveyors. Advantageously, such brackets 4 are arranged to project on either side of the fingers, thus making it possible to run the apparatus in alternate directions.

Further advantageously, the board-supporting surfaces of the brackets are provided with retaining stops that allow the board to move toward the faces of fingers 5 and 6, but not in an opposite direction away therefrom. Such retaining stops must be arranged to be self-adjusting according the angular position of fingers 5 and 6 or, alternatively, controllable so that the stops of fingers 5 are withdrawn into a nonretaining position in the situation illustrated in FIG. 1 in order to permit un-hindered delivery of board 2 from fingers 5 to fingers 6.

Alternative implementations of the apparatus shown in FIGS. 1 and 2 may be contemplated such that the operating direction of the infeed conveyor and the outfeed conveyor, respectively, are aligned orthogonal to the rotation axis or, further alternatively, such that have one conveyor arranged operating parallel to the rotation axis and the other conveyor operating orthogonally thereto.

What is claimed is:

1. An apparatus for turning a top side of boards into an underside, the apparatus comprising:

a first conveyor for importing the boards; and a second conveyor for exporting turned boards and a board turner assembly mounted between the conveyors, the board turner being formed by at least two sets of turning fingers, each one of the sets of turning fingers having its fingers aligned in a plane and being adapted to rotate independently from at least one other set of turning fingers about a common axis parallel with said plane, wherein each one of said sets of turning fingers is arranged to be rotated in a same common direction, and wherein the construction of said conveyors is such that the fingers, during rotary motion of the fingers, pass through gaps in said first conveyor from below and pass through gaps in said second conveyor from above.

2. The apparatus according to claim 1, wherein at least some of the turning fingers are equipped with brackets that are located at the proximal end area of the fingers, disposed at the same distance from the rotary axis and projecting outward from the fingers tangentially on either side thereof with respect to the rotary motion.

3. The apparatus according to claim 2, wherein said brackets are provided with board-retaining stops projecting therefrom toward the distal end of the turning fingers and being self-adjusting according the angular position of the turning fingers.

4. The apparatus according to claim 3, wherein at least one of the turning finger sets is combined to cooperate with a complementary finger set substantially projected in an opposite direction from the axis and being driven by the same actuator as said at least one of the turning finger sets.

5. The apparatus according to claim 4, wherein said at least one of the turning finger sets and its complementary set are arranged to be rotated into a waiting position such that said at least one of the turning finger sets is slightly past or slightly in advance of a top-dead vertical point to receive a board being turned.

6. The apparatus according to claim 2, wherein at least one of the turning finger sets is combined to cooperate with a complementary finger set substantially projected in an opposite direction from the axis and being driven by the same actuator as said at least one of the turning finger sets.

7. The apparatus according to claim 6, wherein said at least one of the turning finger sets and its complementary set are arranged to be rotated into a waiting position such that said at least one of the turning finger sets is slightly past or slightly in advance of a top-dead vertical point to receive a board being turned.

8. The apparatus according to claim 1, wherein at least one of the turning finger sets is combined to cooperate with a complementary finger set substantially projected in an opposite direction from the axis and being driven by the same actuator as said at least one of the turning finger sets.

9. The apparatus according to claim 8, wherein said at least one of the turning finger sets and its complementary set are arranged to be rotated into a waiting position such that said at least one of the turning finger sets is slightly past or slightly in advance of a top-dead vertical point to receive a board being turned.

\* \* \* \* \*